United States Patent
Bertels

[11] Patent Number: 5,337,554
[45] Date of Patent: Aug. 16, 1994

[54] METHOD FOR REDUCING THE PRESSURE OF A GAS FROM A PRIMARY NETWORK

[75] Inventor: Pieter F. M. Bertels, HP Rhoon, Netherlands

[73] Assignee: Asea Brown Boveri Ltd., Baden, Switzerland

[21] Appl. No.: 794,511

[22] Filed: Nov. 19, 1991

[30] Foreign Application Priority Data

Dec. 3, 1990 [CH] Switzerland ............ 3807/90

[51] Int. Cl.⁵ ............................................. F02C 6/00
[52] U.S. Cl. ............................ 60/39.181; 60/39.465
[58] Field of Search ............ 60/39.181, 39.465, 39.02

[56] References Cited

U.S. PATENT DOCUMENTS 4,418,530 12/1983 Bodrov et al. .
4,693,072 9/1987 McLean ................ 60/39.02

FOREIGN PATENT DOCUMENTS 0220510 5/1987 European Pat. Off. .
2814170 10/1979 Fed. Rep. of Germany .
0132727 6/1986 Japan ................ 60/39.181
 524762 8/1972 Switzerland .
0918469 4/1982 U.S.S.R. ................ 60/39.181
1372079 6/1986 U.S.S.R. ................ 60/39.181
2007823 5/1979 United Kingdom .

*Primary Examiner*—Richard A. Bertsch
*Assistant Examiner*—W. J. Wicker
*Attorney, Agent, or Firm*—Burns, Doane, Swecker & Mathis

[57] ABSTRACT

In a method for reducing the pressure of a gas (12) from a primary network, this gas (12) is first fed through a heat exchanger (9) whose temperature potential comes from the exhaust gases (8) of a gas turbine (2), this gas turbine (2) being a constituent part of a gas turbine group (1, 2, 3, 4). Downstream of this heat exchanger (9), the gas (14) is admitted to an expander (10) which drives a compressor (11). The reduced pressure gas (15) from the expander (10) is used to operate the combustion chamber (4) of the gas turbine group. The compressor (11) provides a certain quantity of compressor air (17) which is introduced into the compressor (1) of the gas turbine group. Because both the thermal treatment of the gas (12) from the primary network and the compressor air (17) become available by using internal energy released by the process, the electricity yield from the generator (3) of the gas turbine group is increased in a manner specific to efficiency.

4 Claims, 2 Drawing Sheets

METHOD FOR REDUCING THE PRESSURE OF A GAS FROM A PRIMARY NETWORK

TECHNICAL FIELD

The present invention concerns a method for reducing the pressure of a gas from a long distance gas pipeline transportation system to pressure levels compatible with a local delivery network. More particularly, the present invention relates to a method for efficiently recuperating energy from the high pressure gas during pressure reduction. It also concerns an installation for applying the method.

STATE OF THE ART

In the supply of a gas through a pipeline, for example natural gas, the gas in the primary high pressure transportation network, or long distance gas transportation pipeline system, is subject to very high pressures, of the order of value of 40 bar, in fact this being absolutely necessary for the transport of the gas. The temperatures present in this case are normally approximately 288K. If this gas then now has to be supplied to a secondary network, for example a low pressure consumer delivery distribution network, it is necessary in each case to reduce the original transport pressure of approximately 40 bar to a consumer pressure of approximately 4.4 bar. It is obvious that this throttling process is associated with very large losses of energy. For this reason, the proposal has, in the meantime, been made to provide so-called expanders between the primary network and the secondary network; these expanders can recuperate, during the pressure reduction process, the pressure potential of the gas present in the primary network in the form of electrical energy. In this arrangement, however, low temperatures result at the outlet from the expanders and this has to be dealt with by multi-stage heating of the gas so that the gas temperature in the secondary network is at least 278K, which means that part of the recuperated potential is therefore used up again. If the investment costs for the expanders and for the equipment for the thermal retreatment of the gas after the pressure reduction are included in an economic calculation, it quickly becomes evident that the employment of the capital necessary remains unattractive as far as yield is concerned, and the idea has thus not been found acceptable.

SUMMARY OF THE INVENTION

The invention is intended to help on this point. The invention, as characterised in the claims, is based on the object of maximising, in a method and in an installation of the type mentioned at the beginning, the recuperated potential of the pressure difference between the primary high pressure transportation network and the secondary low pressure consumer delivery network and to carry out the energy conversion with a maximized efficiency yield.

The idea may be seen in the fact that the expansion of fuel gas from the primary network to the consumer pressure is integrated into the circuitry of a gas turbine group, both direct and indirect gas expansion being possible. The essential advantage of the invention may be seen, on the one hand, in that the temperature reduction due to the expansion can be easily countered and compensated for by means of "waste heat" from the process of a gas turbine group. On the other hand, it is also possible, if need be, to operate the combustion chamber of the gas turbine group directly with this gas. In such an arrangement, where the conversion of the pressure potential of the gas flowing in the primary network is combined with a gas turbine group, installation efficiencies of over 75% can be achieved, which represents a clear quality improvement relative to the efficiency of a combined cycle installation, which at the moment is about 50–55%.

Advantageous and expedient developments of the solution according to the invention are characterized in the other claims.

Illustrative examples of the invention are shown and described in more detail below with reference to the drawings. All the elements not immediately necessary for understanding the invention have been omitted. The flow directions of the media are indicated by arrows.

DETAILED DESCRIPTION

Figure 1:
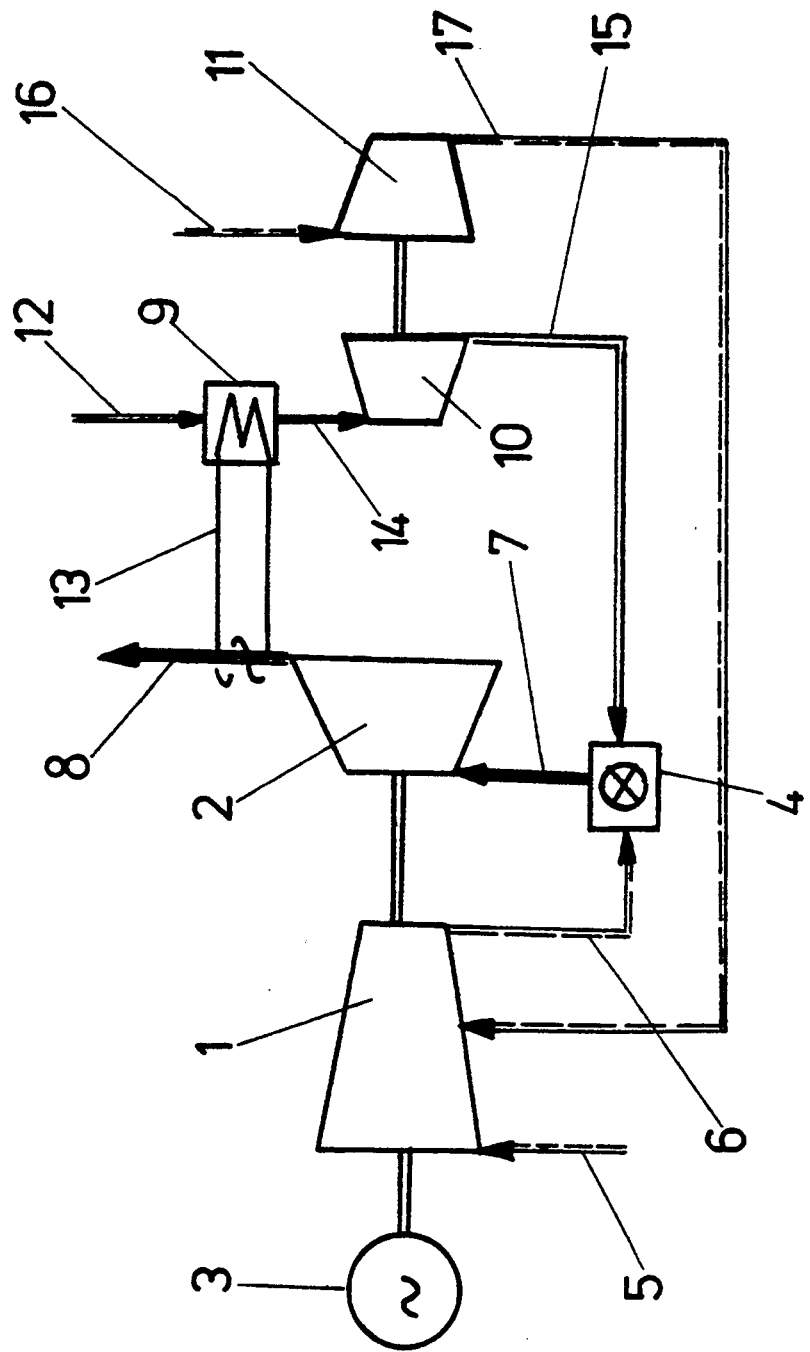
FIG. 1 shows a gas expansion system integrated into a gas turbine group.

FIG. 1 shows a gas turbine group and a circuit of a gas expansion system from a primary network, the gas expansion system being integrated in the gas turbine group. The gas turbine group consists of a compressor 1, a generator 3 connected to the compressor 1, a gas turbine 2 connected to the compressor 1, and a combustion chamber 4 operating between the compressor 1 and the gas turbine 2. The air 5 induced by the compressor 1 flows, after the compression has taken place there, as compressed air 6 into the combustion chamber 4, where its thermal treatment to produce hot gases 7 takes place, these hot gases then being supplied to the gas turbine 2. In the circuit for the expansion of the fuel from the primary network, the highly compressed gas 12 first flows through a heat exchanger 9, which draws its heat potential from the gas turbine exhaust gases 8, as is symbolised by the flow loop 13. The gas 14, now also thermally treated, then flows into an expander 10, which in turn drives a compressor 11. The air 16 induced by this compressor 11 is compressed. The compressed air 17 generated by this means is supplied to the compressor 1 of the gas turbine group at an appropriate location, preferably in the region of a blow-down location of the compressor 1. Because relatively small quantities of air are involved here, the aerodynamic behaviour of this compressor 1 is not impaired. The energy from this compressed air 17 benefits the gas turbine process in such a way that the electrical power of the installation is increased. The gas 15 expanded in the expander 10 is supplied to the combustion chamber 4 of the gas turbine group, where it is used as fuel. The circuit shown in FIG. 1 could be operated with the following characteristics, which only represent a qualitative example:

The gas 12 from the primary network has a pressure of 40 bar and a temperature of 15° C. and is introduced with a mass flow of 10 kg/s. After passing through the heat exchanger 9, the temperature of the gas rises rapidly to 77° C. before it releases a power of the order of 1.37 MW in the expander 10. This power potential is transferred to the compressor 11 with approximately the same power. If a compressor power of 1.37 MW is accordingly assumed, the compressor 11 makes available a compressed air flow of 10.8 kg/s with a pressure of approximately 3 bar and a temperature of approximately 142° C. provided the induced air 16 has a temperature of approximately 15° C. Because the expanded gas 15 is used for operating the combustion chamber 4, it is reduced from the original 40 bar to approximately 15 bar. Its temperature is now still 15° C. If it is also assumed that the compressor 1 of the gas turbine group induces an air flow of 500 kg/s at 15° C., which gives a net output from the generator 3 of 150 MW, then—if the efficiency of the compressor 1 is 9.0% and that of the other compressor 11 in the gas expansion line is 85%—an additional power of 1.29 MW may be expected from the installation without any extra consumption of fuel. The circuit of FIG. 1 can, of course, be modified to supply a certain quantity of gas 18 to the consumer network; in such a case, however, it should be noted that the expansion of this gas must be to lower values, of the order of value of 4.4 bar.

Figure 2:
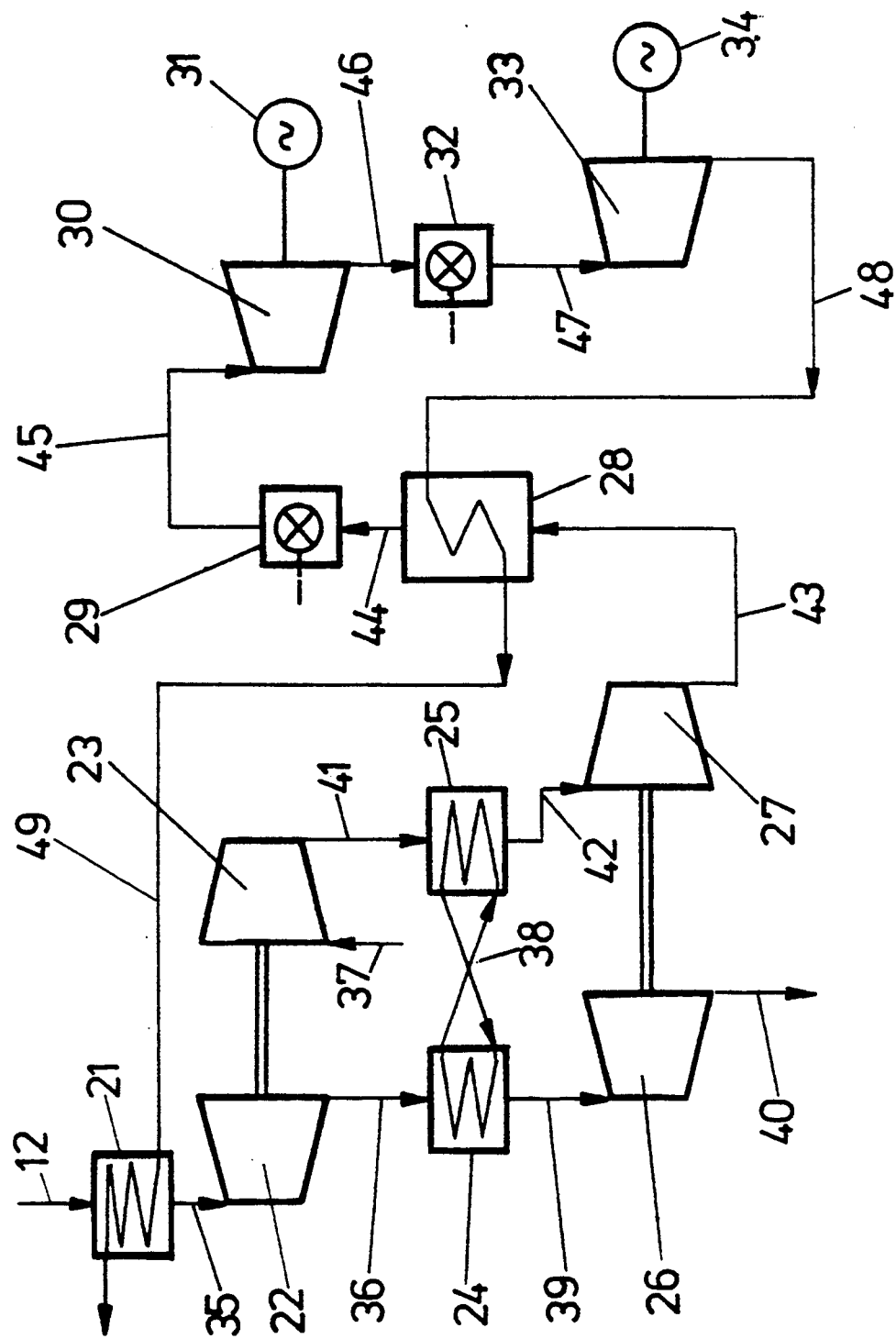
FIG. 2 shows a two-stage gas expansion system which is integrated into a two-stage turbine expansion system.

The circuit of FIG. 2 is designed to expand the gas 12 from the primary network to the extent that it then has the values which are absolutely necessary for supplying a secondary network, i.e. approximately 4.4 bar at a temperature of the order of 20° C. The gas 12 from the primary network, with a pressure of approximately 40 bar and a temperature of approximately 15° C., first passes through a heat exchanger 21 where the temperature of the gas is brought to approximately 120° C. This heated gas 35 is then admitted to an expander turbine 22 which in turn drives a compressor 23. The air 37 induced by this compressor 23 experiences an increase in temperature during the compression; assuming a temperature of the induced air 37 of approximately 15° C. the temperature rises to approximately 142° C. This compressed air 41 then flows through an intercooler 25, in which a temperature reduction to approximately 60° C. occurs. This intercooled air 42 is then compressed in a further downstream compressor 27. This compressor 27 is driven by another expander turbine 26 which acts downstream of a heat exchanger 24 in which the gas 36, already expanded in a first expander turbine 22 and now having a temperature of approximately 42° C., is again thermally heated to approximately 92° C. This heat exchanger 24 obtains its heat from the intercooler 25 downstream of the compressor 23, as symbolised by the connecting lines 38 between the intercooler 25 and the heat exchanger 24. The gas 40 intended for the consumer is expanded in the expander turbine 26 to approximately 4.4 bar, its temperature then being approximately 20° C. On the other hand, the air 42, intercooled to approximately 60° C., is initially further compressed in the compressor 27 driven by the expander turbine 26 to a temperature of approximately 177° C. and a pressure of approximately 7.4 bar at the outlet from this compressor 27. This compressed air 43 then flows through a heat exchanger 28, where the air 43 last mentioned experiences a large increase in temperature to approximately 460° C. By this means, the air flow 44 is treated with respect to both temperature and pressure to the point where it can be subjected to final heating at high efficiency in a downstream combustion chamber 29, the temperature of the working air 45 aimed for here depending on the type of downstream turbine 30. The latter turbine 30 drives a generator 31. The exhaust gases 46 from the latter turbine 30 are again thermally treated in another downstream combustion chamber 32 to produce a flow 47 which is admitted downstream to a further turbine 33 which in turn drives a generator 34. The exhaust gases 48 from the turbine last mentioned still have a thermal potential of the order of 490° C.; they first flow through the heat exchanger 28 placed upstream of the first combustion chamber 29 and then through the heat exchanger 21 placed upstream of the first expander turbine 22. This heat exchanger 21 effects the initial heating of the gas 20 introduced from the primary network. The thermal potential of the exhaust gases 48 is substantially consumed to the extent that they leave the heat exchanger 21 with a temperature of approximately 42° C. As an order of value, an electrical power of 4 MW from the two generators 31, 34 may be expected with this circuit, given a gas mass flow 20 from the primary network of 10 kg/s and a fixed temperature in both combustion chambers of 700° C. With these characteristics, commercial turbo-components can be used directly, with slight adjustments, so that the investment remains low. The efficiency is also very high with this circuit and oscillates around 75%.

While this invention has been illustrated and described in accordance with a preferred embodiment, it is recognized that variations and changes may be made therein without departing from the invention as set forth in the claims.

What is claimed is:

1. An apparatus for recuperating pressure potential energy in expanding a fuel gas from a high pressure transportation system, the apparatus comprising:
   a gas turbine group having;
      a compressor;
      a gas turbine downstream of the compressor;
      a generator driven by the gas turbine; and,
      a combustion chamber between the compressor and the gas turbine;
   a gas expansion system having;
      conduit means for receiving fuel gas from a high pressure transportation system and conducting the gas to said combustion chamber;
      a heat exchanger in said conduit means in which the gas is heated by exhaust gases from the turbine;
      an expander in said conduit means downstream of the heat exchanger, for expanding the gas from the heat exchanger;
      a second compressor driven by the expander; and,
      means for supplying compressed air from the second compressor to the first-mentioned compressor.

2. An apparatus for recuperating pressure potential energy in expanding a fuel gas from a high pressure transportation system, the apparatus comprising:
   conduit means for receiving fuel gas from a high pressure transportation system and conducting the gas to a consumer delivery system;
   an expander system in said conduit means having at least one expander, each expander connected to drive a compressor;
   an intercooler placed downstream of the expander and compressor for heating gas expanded in the expander and cooling air compressed in the compressor;
   a gas turbine group including at least one gas turbine driving a generator and having a combustion chamber supplying propellant gas to each turbine; and,
   means for supplying compressed air from at least one compressor to a combustion chamber, wherein the gas exiting the expander system has consumer pressure and the compressed air supplied to the gas turbine group increases the energy output of the group.

3. An apparatus for recuperating pressure potential energy in expanding a gas from a high pressure transportation system, comprising:
   a gas turbine group, comprising:
      a gas turbine;
      a combustion chamber supplying propellant gas to the turbine;
      a first compressor driven by the gas turbine and supplying compressed air to the combustion chamber; and
      a generator driven by the gas turbine;
   a heat exchanger supplied with exhaust gas from the gas turbine;
   conduit means for receiving high pressure gas from a gas transportation system and conducting the gas through the heat exchanger to the combustion chamber;and,
      an expander connected downstream from the heat exchanger for expanding heated high pressure gas;
      means for supplying gas from the expander to the combustion chamber;
      a second compressor driven by the expander; and,
      means for supplying compressed air from the second compressor to the first compressor to increase the energy of the turbine group.

4. An apparatus for recuperating pressure potential energy from high pressure gas in a gas transportation system during expansion of the gas for use in a local gas delivery network, the apparatus comprising:
   conduit means for receiving fuel gas from a high pressure transportation system and conducting the gas to a low pressure consumer delivery system;
   a gas expander apparatus in said conduit means, comprising:
      a first heat exchanger for heating high pressure gas from the transportation network;
      a first expander downstream of said first heat exchanger for expanding heated high pressure gas;
      an intercooler downstream of said expander for heating the expanded gas;
      a second expander downstream of said intercooler to further expand the heated expanded gas to consumer pressure, the second expander connected to deliver expanded gas to a local distribution network; and,
   a gas turbine group, integrated with the expander apparatus, comprising:
      a first compressor, driven by the first expander to compress air;
      a cooling side of the intercooler arranged downstream of the first compressor for cooling compressed air from the first compressor;
      a second compressor, driven by the second expander to further compress air from the cooling unit;
      a second heat exchanger for heating compressed air from the second compressor;
      a first combustion chamber for combusting the compressed air form the second compressor to form propellant gas;
      a first turbine driven by the propellant gas;
      a first generator driven by the first turbine;
      a second combustion chamber for combusting the exhaust gas from the first turbine to form additional propellant gas;
      a second turbine driven by the additional propellant gas;
      a second generator driven by the second turbine;
   wherein the exhaust gas from the second turbine is fed to the second heat exchanger to heat the compressed air, and the discharge from the second heat exchanger is fed to the first heat exchanger to heat the high pressure gas.

* * * * *